(12) United States Patent
Maranan et al.

(10) Patent No.: US 9,205,615 B2
(45) Date of Patent: Dec. 8, 2015

(54) METHOD OF FORMING MIDSOLE OF TWO MATERIALS

(71) Applicant: NIKE, Inc., Beaverton, OR (US)

(72) Inventors: Estelle Maranan, Beaverton, OR (US); Michael Hochdoerffer, Beaverton, OR (US); Clara Ho, Beaverton, OR (US); Stanley Chen, Beaverton, OR (US); Justin R. Taylor, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 431 days.

(21) Appl. No.: 13/781,868

(22) Filed: Mar. 1, 2013

(65) Prior Publication Data

US 2014/0246804 A1    Sep. 4, 2014

(51) Int. Cl.
*B29D 35/12* (2010.01)
*A43B 7/14* (2006.01)
*A43B 13/12* (2006.01)
*B29D 35/14* (2010.01)

(52) U.S. Cl.
CPC ............. *B29D 35/122* (2013.01); *A43B 7/145* (2013.01); *A43B 7/1435* (2013.01); *A43B 13/127* (2013.01); *B29D 35/142* (2013.01); *B29D 35/148* (2013.01)

(58) Field of Classification Search
None
See application file for complete search history.

(56) References Cited

U.S. PATENT DOCUMENTS

| 4,667,423 | A  | 5/1987  | Autry et al.   |
|-----------|----|---------|----------------|
| 5,951,935 | A  | 9/1999  | Healy et al.   |
| 8,246,881 | B2 | 8/2012  | Maranan et al. |
| 2007/0126146 | A1 | 6/2007 | Yang         |
| 2010/0275470 | A1 | 11/2010 | Hoffer et al. |
| 2011/0047721 | A1 | 3/2011 | Sills et al.  |

FOREIGN PATENT DOCUMENTS

| CN | 201440990      | 4/2010 |
| EP | 1972223 A1     | 9/2008 |
| JP | 04272702 A     | 2/1991 |
| JP | 404183401 A    | 6/1992 |
| WO | 9933368 A2     | 7/1999 |
| WO | 2008/019980 A2 | 2/2008 |

OTHER PUBLICATIONS

International Search Report and the Written Opinion of the International Searching Authority issued in corrreponding International Application No. PCT/US2014/019413, dated May 30, 2014.

*Primary Examiner* — Edmund Lee
(74) *Attorney, Agent, or Firm* — Banner & Witcoff, Ltd.

(57) ABSTRACT

A first portion of a midsole formed of a first material has a recess in a top surface thereof, and a first aperture positioned within the recess and extending therethrough. The first portion is placed in a recess in a bottom plate of a second mold assembly. A middle plate with a second aperture extending therethrough is placed in contact with the bottom plate. A second material is inserted through the second aperture such that it fills the recess and the first aperture in the first portion to form a second portion of the midsole. A top plate of the second mold assembly is positioned in contact with the middle plate so as to close the second mold assembly. The second mold assembly is subjected to heat and pressure such that the second portion cures and bonds to the first portion of the midsole.

19 Claims, 4 Drawing Sheets

METHOD OF FORMING MIDSOLE OF TWO MATERIALS

FIELD

Aspects of this invention relate generally to a method of manufacturing an article of footwear with an improved sole assembly and, in particular, to a method of manufacturing an article of footwear with a midsole formed of two materials.

BACKGROUND

Conventional articles of athletic footwear generally include two primary elements, an upper and a sole assembly or sole structure. The upper is secured to the sole structure and forms a void on the interior of the footwear for comfortably and securely receiving a foot. The sole structure is secured to a lower portion of the upper and is positioned between the foot and the ground. The sole structure generally incorporates multiple layers that are conventionally referred to as an insole, a midsole, and an outsole. The insole, or sockliner, is a thin, compressible member located within the void and proximate a lower surface of the foot to enhance footwear comfort.

The outsole forms a ground-engaging portion (or other contact surface-engaging portion) of the sole structure, and is formed from a durable and wear-resistant material that includes texturing to improve traction.

To keep a wearer safe and comfortable, footwear is called upon to perform a variety of functions. For example, the sole structure of footwear should provide adequate support and impact force attenuation properties to prevent injury and reduce fatigue, while at the same time provide adequate flexibility so that the sole structure articulates, flexes, stretches, or otherwise moves to allow an individual to fully utilize the natural motion of the foot.

The midsole, which is conventionally secured to the upper along the length of the upper, forms a middle layer of the sole structure and is primarily responsible for attenuating ground (or other contact surface) reaction forces to lessen stresses upon the foot and leg, may also beneficially utilizing such ground reaction forces for more efficient toe-off, and control potentially harmful foot motions, such as over pronation. Conventional midsoles may include a foam material to attenuate impact forces and absorb energy when the footwear contacts the ground during athletic activities. Other midsoles may utilize fluid-filled bladders (e.g., filled with air or other gasses) to attenuate impact forces and absorb energy.

Although foam materials in the midsole succeed in attenuating impact forces for the foot, foam materials that are relatively soft may also impart instability that increases in proportion to midsole thickness. For example, the use of very soft materials in the midsole of running shoes, while providing protection against vertical impact forces, can encourage instability of the ankle, thereby contributing to the tendency for over-pronation. This instability has been cited as a contributor to "runner's knee" and other athletic injuries. For this reason, footwear design often involves a balance or tradeoff between impact force attenuation and stability.

Stabilization is also a factor in sports like basketball, volleyball, football, and soccer. In addition to running, an athlete may be required to perform a variety of motions including transverse movement; quickly executed direction changes, stops, and starts; movement in a backward direction; and jumping. While making such movements, footwear instability may lead to excessive inversion or eversion of the ankle joint, potentially causing an ankle sprain.

It would be desirable to provide an article of footwear with a sole assembly that reduces or overcomes some or all of the difficulties inherent in prior known devices. Particular advantages will be apparent to those skilled in the art, that is, those who are knowledgeable or experienced in this field of technology, in view of the following disclosure of the invention and detailed description of certain embodiments.

SUMMARY

The principles of the invention may be used to manufacture an article of footwear with an improved midsole assembly. In accordance with a first aspect, a first portion of a midsole formed of a first material has a recess in a top surface thereof, and a first aperture positioned within the recess and extending therethrough. The first portion is placed in a recess in a bottom plate of a second mold assembly. A middle plate with a second aperture extending therethrough is placed in contact with the bottom plate. A second material is inserted through the second aperture such that it fills the recess and the first aperture in the first portion to form a second portion of the midsole. A top plate of the second mold assembly is positioned in contact with the middle plate so as to close the second mold assembly. The second mold assembly is subjected to heat and pressure such that the second portion cures and bonds to the first portion of the midsole.

In accordance with another aspect, a first portion of a midsole formed of a first material has a recess in a top surface thereof, and a plurality of first apertures positioned within the recess and extending therethrough. The first portion is placed in a recess in a bottom plate of a second mold assembly. A middle plate with a second aperture extending therethrough is placed in contact with the bottom plate. The middle plate has a projection extending downwardly from its lower surface. A second material is inserted through the second aperture such that it fills the recess and the first aperture in the first portion to form a second portion of the midsole. A top plate of the second mold assembly is positioned in contact with the middle plate so as to close the second mold assembly. The top plate has a projection extending downwardly from its lower surface, which is received in the second aperture. The second mold assembly is subjected to heat and pressure such that the second portion cures and bonds to the first portion of the midsole.

In accordance with a further aspect, a first portion of a midsole formed of EVA has a recess in a top surface thereof, and a plurality of first apertures positioned within the recess and extending therethrough. The first portion is placed in a recess in a bottom plate of a second mold assembly. A middle plate with a second aperture extending therethrough is placed in contact with the bottom plate. The middle plate has a second aperture extending therethrough and a projection extending downwardly from a lower surface thereof. Polyurethane is poured through the second aperture such that it fills the recess and the first aperture in the first portion to form a second portion of the midsole. A top plate of the second mold assembly is positioned in contact with the middle plate so as to close the second mold assembly. The top plate has a projection extending downwardly from its lower surface that is received in the second aperture. The second mold assembly is subjected to heat and pressure such that the second portion cures and bonds to the first portion of the midsole.

Midsoles formed in the mold assembly described herein can provide improved support and performance in particular areas of the midsole. These and additional features and advantages disclosed here will be further understood from the following detailed disclosure of certain embodiments.

Figure 1:
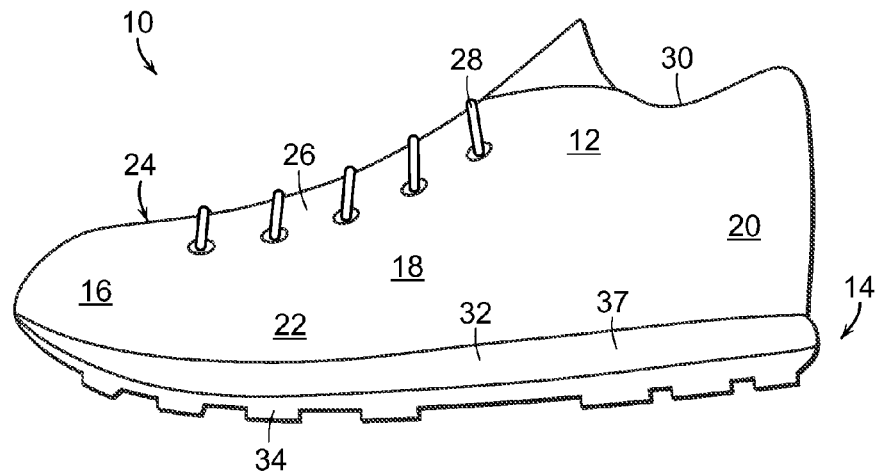
FIG. 1 is an elevation view of an article of footwear shown with an upper and a sole assembly.

The figures referred to above are not drawn necessarily to scale, should be understood to provide a representation of particular embodiments of the invention, and are merely conceptual in nature and illustrative of the principles involved. Some features of the mold assembly and footwear depicted in the drawings have been enlarged or distorted relative to others to facilitate explanation and understanding. The same reference numbers are used in the drawings for similar or identical components and features shown in various alternative embodiments. Midsoles for footwear manufactured as disclosed herein would have configurations and components determined, in part, by the intended application and environment in which they are used.

DETAILED DESCRIPTION OF CERTAIN PREFERRED EMBODIMENTS

An article of footwear 10 is depicted in FIG. 1 as including an upper 12 and a sole assembly 14. For purposes of reference in the following description, footwear 10 may be divided into three general regions: a forefoot region 16, a midfoot region 18, and a heel region 20. Regions 16-20 are not intended to demarcate precise areas of footwear 10. Rather, regions 16-20 are intended to represent general areas of footwear 10 that provide a frame of reference during the following discussion. Although regions 16-20 apply generally to footwear 10, references to regions 16-20 also may apply specifically to upper 12, sole assembly 14, or individual components within either upper 12 or sole assembly 14.

Upper 12 defines a void or chamber for receiving a foot. For purposes of reference, upper 12 includes a lateral side 22, an opposite medial side 24, and a vamp or instep area 26. Lateral side 22 is positioned to extend along a lateral side of the foot (i.e., the outside) and generally passes through each of regions 16-20. Similarly, medial side 24 is positioned to extend along an opposite medial side of the foot (i.e., the inside) and generally passes through each of regions 16-20. Upper 12 may also include a closure mechanism, such as lace 28. Upper 12 also includes an ankle opening 30 that provides the foot with access to the void within upper 12.

Upper 12 may also include an insole (or sockliner, not shown), which is generally a thin, compressible member located within the void for receiving the foot and proximate to a lower surface of the foot. Typically, the insole, which is configured to enhance footwear comfort, may be formed of foam, and optionally a foam component covered by a moisture wicking fabric or textile material. Further, the insole or sockliner may be glued or otherwise attached to the other components of footwear 10, although it need not be attached, if desired.

Sole assembly 14 includes a midsole 32 positioned below upper 12. In certain embodiments, it is to be appreciated that midsole 32 may incorporate sealed chambers, such as fluid-filled bladders. Midsole 32 may be directly secured to upper 12 with an adhesive, for example. Suitable adhesives are well known in the art and need not be discussed in greater detail here. Midsole 32 may be secured to upper 12 with any other suitable fastening means, and such other suitable means of midsole 32 to upper 12 will become readily apparent to those skilled in the art, given the benefit of this disclosure.

An outsole 34 is positioned below midsole 32, and may be secured to midsole 32 with an adhesive, for example. Suitable adhesives are well known in the art and need not be discussed in greater detail here. Other suitable means of fastening outsole 34 to midsole 32 will become readily apparent to those skilled in the art, given the benefit of this disclosure.

Suitable materials for outsole 34 include any of the conventional rubber materials that are utilized in footwear outsoles, such as carbon black rubber compound. Other suitable materials for outsole 34 will become readily apparent to those skilled in the art, given the benefit of this disclosure.

Figure 2:
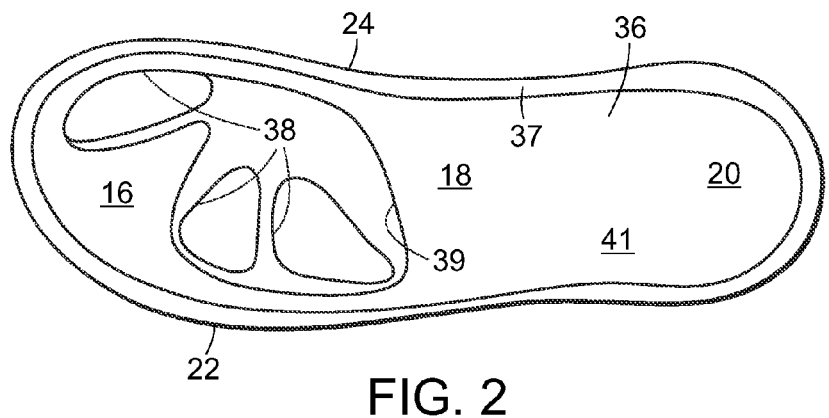
FIG. 2 is a top plan view of a first portion of a midsole of the sole assembly of FIG. 1.

As seen in FIG. 2, a first portion 36 of midsole 32 is seen to include a peripheral wall 37 extending upwardly about its periphery and a plurality of first apertures 38. A recess 39 is formed in the top or upper surface 41 of first portion 36. Recess 39 extends around first apertures 38. It is to be appreciated that in certain embodiments, first portion 36 may include only a single first aperture 38, while in other embodiments, more than three first apertures 38 can be provided in first portion 36.

As illustrated here, recess 39 and all of first apertures 38 and are positioned in forefoot region 16 of first portion 36. However, it is to be appreciated that first apertures 38 can be positioned at any location throughout first portion 36. That is, first apertures 38 can be positioned in any or all of forefoot region 16, midfoot region 18, and heel region 20. Recess 39 could accordingly be positioned in any or all of forefoot region 16, midfoot region 18, and heel region 20. It is to be appreciated that there may be more than one recess 39 formed in upper surface 41.

A method of forming midsole 32 includes a step of forming first portion 36 in a first mold assembly (not shown) in known fashion. As described above, first portion 36 includes one or more first apertures 38 and recess 39. As seen here, first apertures 38 are all positioned in forefoot region 16 of first portion 36. It is to be appreciated that one or more first apertures 38 can be positioned in or more of forefoot region 16, midfoot region 18, and/or heel region 20, with one or more recesses 39 positioned about the corresponding locations of first apertures 38.

Figure 3:
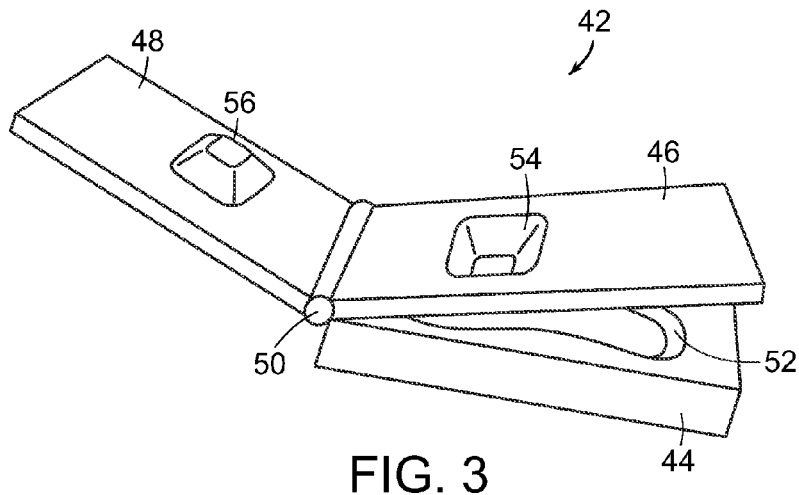
FIG. 3 is a perspective view of a mold assembly used to form the midsole of the sole assembly of FIG. 1.

A second mold assembly 42, seen in an open condition in FIG. 3, includes a first or bottom plate 44, a second or middle plate 46, and a third or top plate 48. Bottom plate 44, middle plate 46, and top plate 48 may be pivotally secured to one another with a hinge assembly 50.

Bottom plate 44 includes a recess 52 sized to receive first portion 36, as described in greater detail below. Middle plate 46 includes a second aperture 54 extending therethrough. Top plate 48 includes a projection 56 extending downwardly from its bottom surface 58. Projection 56 is received in second aperture 54 when second mold assembly 42 is closed, as described in greater detail below.

Figure 4:
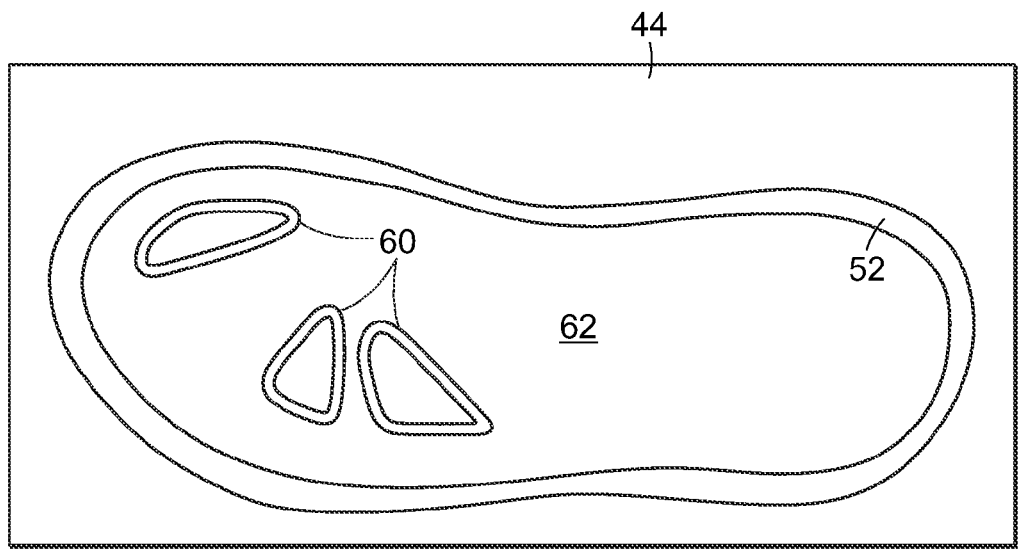
FIG. 4 is a top plan view of the bottom plate of the mold assembly of FIG. 3.

As seen in FIG. 4, one or more surface irregularities 60 may be formed in or on the bottom surface 62 of recess 52. Surface irregularities 60 are positioned on bottom surface 62 so as to be exposed through first apertures 38 when first portion 36 of midsole 32 is seated in recess 52. In this embodiment, surface irregularities 60 are projections or ribs 60 extending upwardly from bottom surface 62 of bottom plate 44. It is to be appreciated that surface irregularities 60 can take any desired shape. For example, in certain embodiments, surface irregularities 60 and be projections or any other structure extending upwardly from upper surface 62. In other embodiments, surface irregularities 60 can be recesses, grooves, or any other depression formed in upper surface 62. Further, surface irregularities 60 can include any combination of projections and recesses. As seen here, each surface irregularity is a rib 60. However, it is to be appreciated that upper surface 62 could include some ribs 60 along with other surface irregularities having any desired shape.

Figure 5:
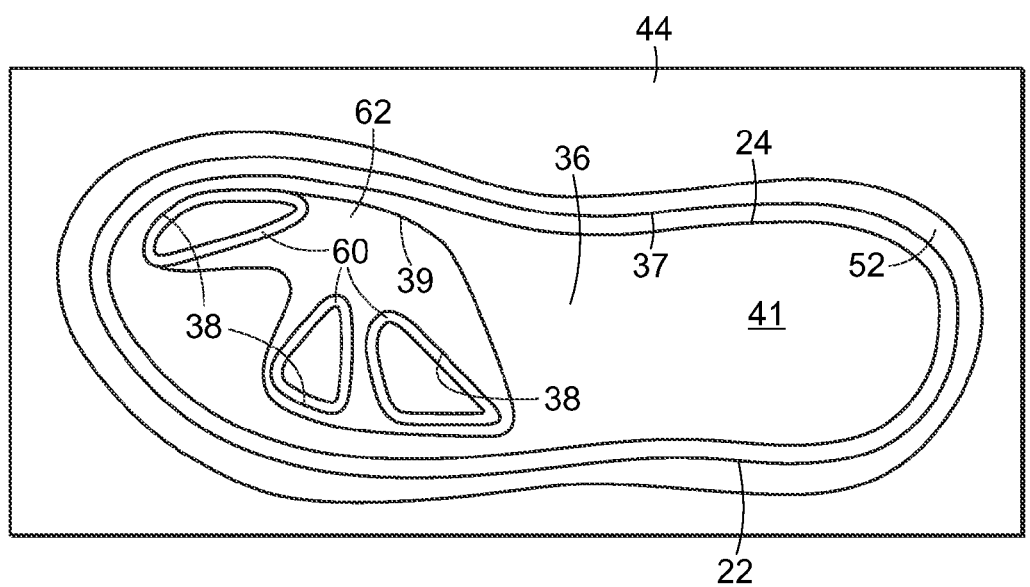
FIG. 5 is a top plan view of the bottom plate of the mold assembly of FIG. 3, shown with the first portion of FIG. 2 received in a recess in the bottom plate.
Figure 6:
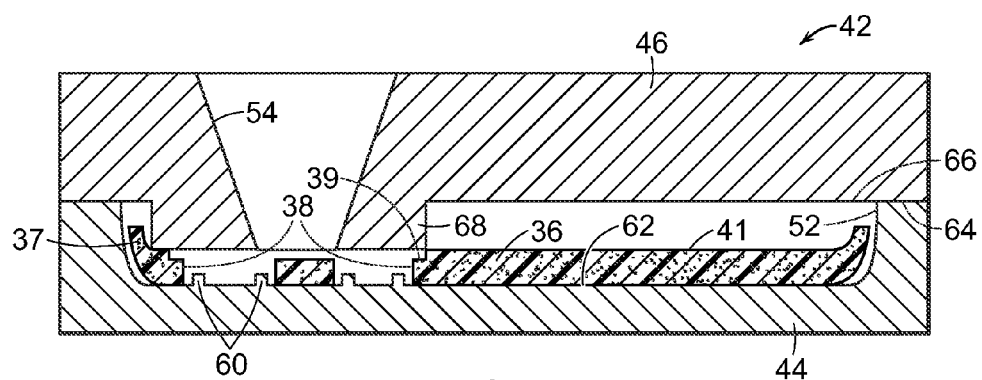
FIG. 6 is a section view of a portion of the mold assembly of FIG. 3, shown with the first portion in the recess of the bottom plate, and a middle plate of the mold assembly in a closed condition and in contact with the bottom plate.

To form midsole 32, first portion 36 is placed in recess 52, as seen in FIG. 5. As seen here, ribs 60 extend upwardly into first apertures 38, and extend about the periphery of first apertures 38. First portion 36 and recess 52 may be sized such that peripheral wall 37 of first portion 36 is spaced from recess 52 when first portion 36 is seated in recess 52, as seen in FIG. 6. In certain embodiments, peripheral wall 37 is spaced from recess 52 by approximately 1.5 mm. Middle plate 46 is then pivoted about hinge assembly 50 to a closed position such that its lower surface 64 is in contact with an upper surface 66 of bottom plate 44, as seen in FIG. 6. As seen here, a projection 68 extends downwardly from lower surface 64 of middle plate 46. Projection 68 extends above recess 39 of first portion 36 and above first apertures 38.

Figure 7:
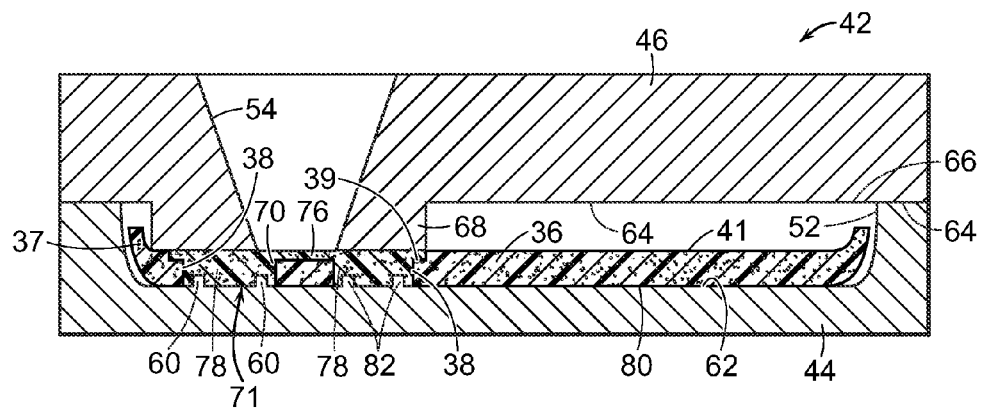
FIG. 7 is a section view of a portion of the mold assembly of FIG. 3, shown with a second material used to form a second portion of the midsole received in a recess and apertures formed in the first portion.
Figure 8:
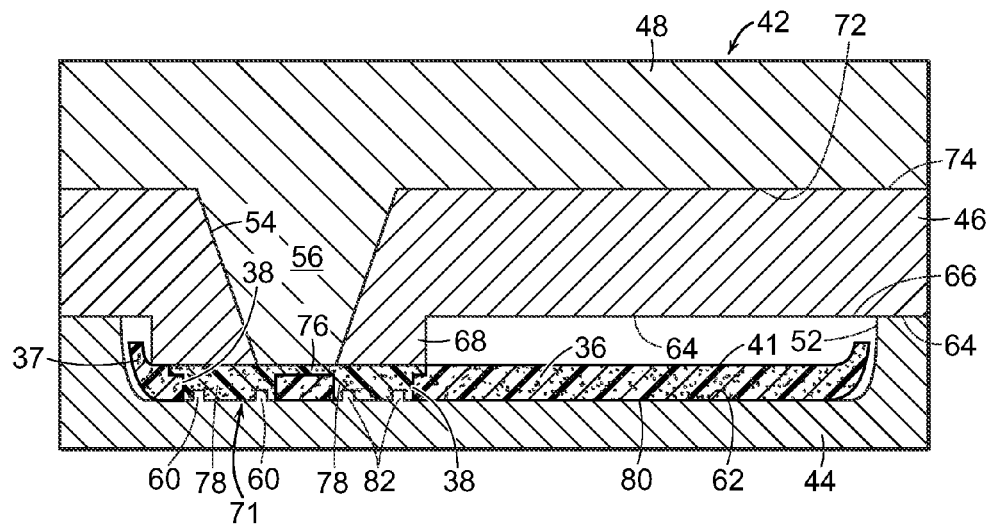
FIG. 8 is a section view of a portion of the mold assembly of FIG. 3, shown with the top plate of the mold assembly in a closed condition and in contact with the middle plate.

As seen in FIG. 7, a second material 70 is then inserted through second aperture 54 of middle plate 46 so as to fill first apertures 38 and recess 39 and form second portion 71 of midsole 32. Top plate 48 is then pivoted about hinge assembly 50 to a closed position such that its lower surface 72 is in contact with an upper surface 74 of middle plate 46, as seen in FIG. 8. Projection 56 of top plate 48 is received in second aperture 54 when second mold assembly 42 is closed, such that a lower surface of projection 56 is positioned above recess 39 and is substantially flush with the lower surface of projection 68 of middle plate 46.

In certain embodiments, second material 70 is poured through second aperture 54 into recess 39 and first apertures 38. It is to be appreciated that other methods or ways of getting second material 70 are considered to be within the scope of the present invention. For example, second material 70 could be injected or otherwise inserted into recess 39 and first apertures 38.

Second mold assembly 42 is then subjected to heat and pressure for a desired amount of time to cure second portion 71 and bond it to first portion 36. In certain embodiments, second mold assembly is subjected to a heat of between approximately 55° C. and approximately 60° C. In certain embodiments, second mold assembly 42 is subjected to heat and pressure for a time of at least approximately 7 minutes and 30 seconds.

After second portion 71 is cured and bonded to first portion 36, second mold assembly 42 is opened, and midsole 32 is removed from second mold assembly 42. It is to be appreciated that midsole 32 may be trimmed or otherwise post-treated once it is removed from second mold assembly 42.

Figure 9:
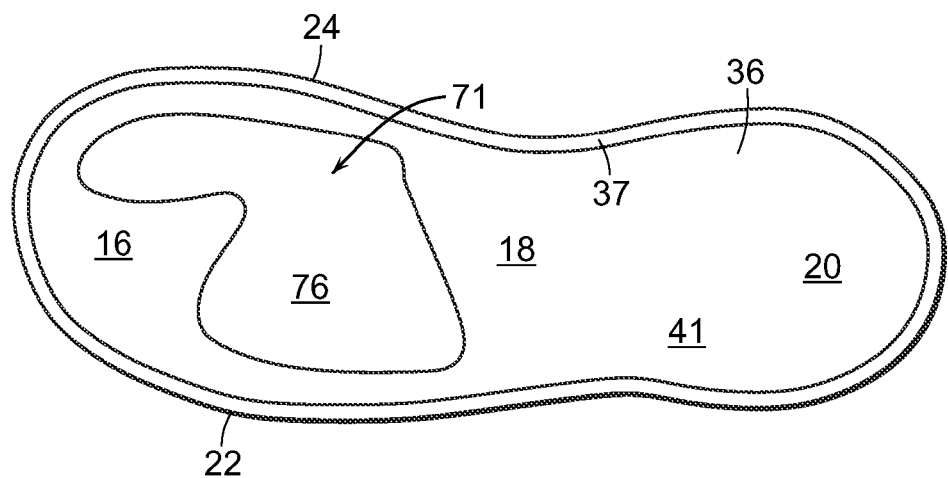
FIG. 9 is a bottom plan view of the fully formed midsole formed in the mold assembly of FIG. 3.
Figure 10:
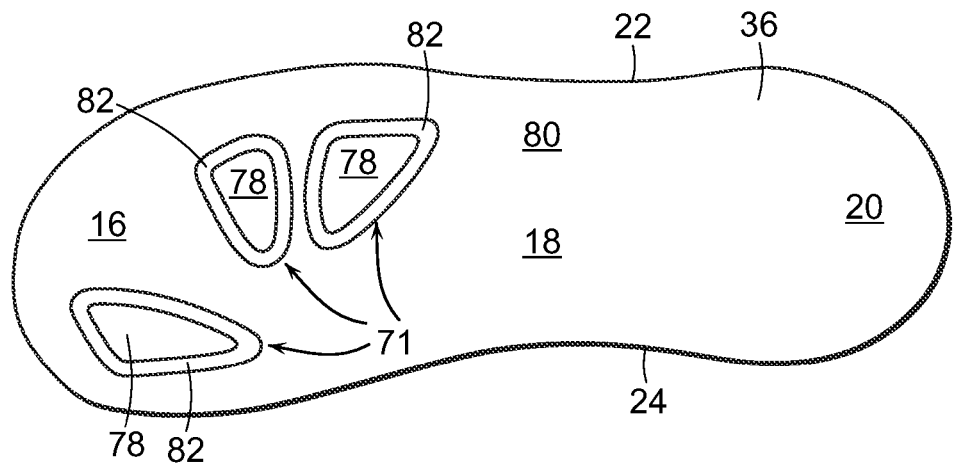
FIG. 10 is a top plan view of the fully formed midsole formed in the mold assembly of FIG. 3.

As seen in FIGS. 8-10, second portion includes an upper portion 76 and a plurality of inserts 78 that extend downwardly from upper portion 76 into first apertures 38 of first portion 36. It is to be appreciated that there may be some bleeding of second material 70 beyond the edges of recess 39 as it cures within second mold assembly 42, as well as outwardly from the edges of first apertures 38 along the bottom surface 80 of first portion 36.

As seen in FIGS. 7, 8 and 10, ribs 60 of bottom plate 44 form corresponding channels 82 in the bottom surface of inserts 78 when second portion 71 is formed within second mold assembly 42. It is to be appreciated that in some embodiments where surface irregularities 60 are not in the form of ribs, that surface irregularities having shapes other than channels will be formed in the bottom surface of inserts 78.

Second material 70 is a different material than the first material used to form first portion 36 of midsole 32. In certain embodiments, first portion 36 is formed of a first material having a first hardness or density, while second material 70 has a second hardness or density that is less than that of the first material and, therefore is more resilient. In other embodiments, second material 70 could be harder and less resilient than the first material.

In certain embodiments, first portion 36 is formed of a resilient, polymer foam material, such as ethyl vinyl acetate ("EVA" or "phylon"). In certain embodiments, first portion 36 is formed of injection phylon. In certain embodiments, second material 70 is polyurethane ("PU"). It is to be appreciated that in certain embodiments, second material 70 is softer, or less dense, than the first material used to form first portion 36. In certain embodiments, the first material used to form first portion 36 has a hardness of approximately 59+/−2 C on the Asker C scale while second material 70 has a hardness of approximately 55+/−3 C on the Asker C scale. Other suitable materials for first portion 36 and second material 70 will become readily apparent to those skilled in the art, given the benefit of this disclosure.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:
1. A method of forming a midsole comprising:
   forming a first portion of a midsole in a first mold assembly, the first portion formed of a first material, having a recess in a top surface thereof, and a first aperture positioned within the recess and extending therethrough;
   placing the first portion in a recess formed in a bottom plate of a second mold assembly;

placing a middle plate of the second mold assembly in contact with the bottom plate, the middle plate having a second aperture extending therethrough;

inserting a second material through the second aperture such that it fills the recess and the first aperture in the first portion to form a second portion of the midsole;

positioning a top plate of the second mold assembly in contact with the middle plate so as to close the second mold assembly;

subjecting the second mold assembly to heat and pressure such that the second portion cures and bonds to the first portion of the midsole;

opening the second mold assembly; and removing the midsole from the second mold assembly.

2. The method of claim 1, wherein a hardness of the second material is different than a hardness of the first material.

3. The method of claim 2, wherein the hardness of the second material is less than the hardness of the first material.

4. The method of claim 1, wherein the second material is polyurethane.

5. The method of claim 1, wherein the first material is injection phylon.

6. The method of claim 1, wherein the first portion includes a plurality of first apertures extending therethrough.

7. The method of claim 6, wherein the first apertures are positioned in a forefoot region of the first portion.

8. The method of claim 6, wherein the first apertures are in positioned within the recess in the first portion.

9. The method of claim 1, wherein a projection extends downwardly from a lower surface of the middle plate, the projection being positioned above the recess formed in the first portion.

10. The method of claim 1, wherein a projection extends downwardly from a lower surface of the top plate and is received in the second aperture in the middle plate when the top plate is closed and in contact with the middle plate.

11. The method of claim 1, wherein an upper surface of the recess of the bottom plate includes a surface irregularity.

12. The method of claim 11, wherein the surface irregularity is a rib extending upwardly from the upper surface of the recess of the bottom plate.

13. A method of forming a midsole comprising:

forming a first portion of a midsole in a first mold assembly, the first portion formed of a first material, having a recess in a top surface thereof, and a plurality of first apertures positioned within the recess and extending therethrough;

placing the first portion in a recess formed in a bottom plate of a second mold assembly;

placing a middle plate of the second mold assembly in contact with the bottom plate, the middle plate having a second aperture extending therethrough and a projection extending downwardly from a lower surface thereof, the projection and the second aperture being positioned above the recess in the first portion;

inserting a second material through the second aperture such that it fills the recess and the first apertures in the first portion to form a second portion of the midsole;

positioning a top plate of the second mold assembly in contact with the middle plate so as to close the second mold assembly, the top plate having a projection extending downwardly from its lower surface that is received in the second aperture;

subjecting the second mold assembly to heat and pressure such that the second portion cures and bonds to the first portion of the midsole;

opening the second mold assembly; and removing the midsole from the second mold assembly.

14. The method of claim 13, wherein the first apertures are positioned in a forefoot region of the first portion.

15. The method of claim 13, wherein a hardness of the second material is different than a hardness of the first material.

16. The method of claim 15, wherein the hardness of the second material is less than the hardness of the first material.

17. The method of claim 13, wherein the second material is polyurethane.

18. The method of claim 13, wherein the first material is injection phylon.

19. A method of forming a midsole comprising:

forming a first portion of a midsole in a first mold assembly, the first portion formed of injection phylon, having a recess in a top surface thereof, and a plurality of first apertures positioned within the recess and extending therethrough;

placing the first portion in a recess formed in a bottom plate of a second mold assembly;

placing a middle plate of the second mold assembly in contact with the bottom plate, the middle plate having a second aperture extending therethrough and a projection extending downwardly from a lower surface thereof, the projection and the second aperture being positioned above the recess in the first portion;

pouring polyurethane through the second aperture such that it fills the recess in the first portion and the first apertures to form a second portion of the midsole;

positioning a top plate of the second mold assembly in contact with the middle plate so as to close the second mold assembly, the top plate having a projection extending downwardly from its lower surface that is received in the second aperture;

subjecting the second mold assembly to heat and pressure such that the second portion cures and bonds to the first portion;

opening the second mold assembly; and removing the midsole from the second mold assembly.

* * * * *